June 2, 1970 W. O. SCHLOSSER 3,516,008
POWER COMBINING CIRCUIT FOR A PLURALITY OF MICROWAVE GENERATORS
Filed May 3, 1968
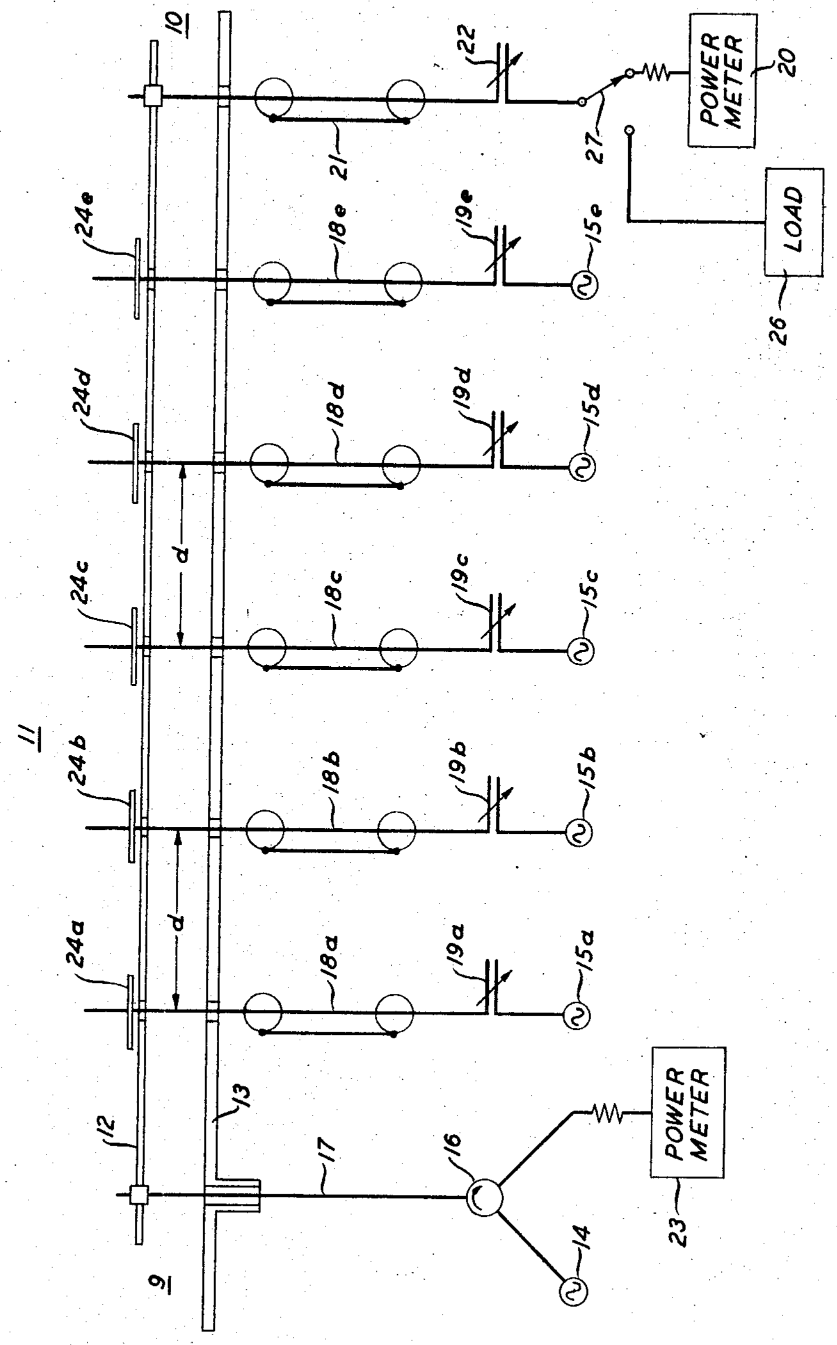
INVENTOR
W. O. SCHLOSSER
BY
ATTORNEY

United States Patent Office 3,516,008
Patented June 2, 1970

3,516,008

POWER COMBINING CIRCUIT FOR A PLURALITY OF MICROWAVE GENERATORS

Wolfgang O. Schlosser, Basking Ridge, N.J., assignor to Bell Telephone Laboratories, Incorporated, Murray Hill and Berkeley Heights, N.J., a corporation of New York Filed May 3, 1968, Ser. No. 726,367
Int. Cl. H03b 7/14; H03h 13/00
U.S. Cl. 331—56 6 Claims

ABSTRACT OF THE DISCLOSURE

A primary oscillator is connected through a circulator to an input end of a transmission line. A plurality of secondary oscillators of approximately the same frequency as the primary oscillator are reactively coupled to the transmission line between the input end and an output end at intervals of approximately an odd number of quarter wavelengths. Tuning stubs and the reactive couplers associated with each of the secondary oscillators are adjusted to maximize power output from each oscillator to a load connected to the output end.

BACKGROUND OF THE INVENTION

Considerable effort has been made in an attempt to provide economical and reliable microwave sources capable of delivering continuous high frequency and high power wave energy. Solid state sources such as transistors, Gunn-effect diodes, and IMPATT diodes have the advantage of being more economical, reliable and longer-lived than vacuum tubes such as klystrons and close-space triodes. Most solid state sources, however, have a limited power output capacity, particularly as their frequency of operation is increased.

It has long been recognized that if the power outputs of a plurality of solid state oscillators could be combined, high power and high frequency could simultaneously be achieved without resort to tubes. For example, the copending application of Barber et al., Ser. No. 586,890, filed Oct. 14, 1966, now Pat. No. 3,393,375, assigned to Bell Telephone Laboratories, Incorporated, describes a circuit for combining the outputs of a plurality of negative resistance diodes such as Gunn-effect diodes, LSA diodes, or IMPATT diodes. The circuit is fairly complex, however, in that it requires a plurality of rectifying diodes, phase shifters, transistors, and delay devices.

SUMMARY OF THE INVENTION

I have found that the power outputs of a plurality of microwave oscillators can be combined and delivered as a single continuous electromagnetic wave to a load by the following illustrative technique. A primary oscillator is connected through an isolating device, which may be a circulator, to an input end of a transmission line. A plurality of secondary oscillators, of the same frequency as the primary oscillator, are reactively coupled to the transmission line between the input end and an output end and are separated by approximately an odd number of quarter wavelengths at the operating frequency. It can be shown that the primary oscillator frequency locks all of the secondary oscillators so that the outputs of all of the oscillators are combined into a continuous wave that propagates in a single oscillatory mode in the transmission line.

It can also be shown that unless the locked secondary oscillators are mutually separated by precisely an odd integral number of quarter wavelengths, and unless their reactive coupling to the transmission line decreases in the direction of the output end of the line, some of their output power will propagate toward the input end of the transmission line. Moreover, as a practical matter, it is virtually impossible to space the reactive couplings to within tolerances of less than several electrical degrees because of the short wavelengths contemplated. However, compensation for deviations from the optimum spacing can be made by tuning each secondary oscillator such as to maximize the power delivered to the load and to minimize and eliminate power delivered toward the input end of the line. Although each oscillator resonator is tuned, the oscillator frequency remains locked to the primary oscillator frequency as will be described more fully later. The reative coupling of each secondary oscillator is adjusted concurrently with resonator tuning.

DRAWING DESCRIPTION

These and other objects, features and advantages of the invention will be better understood from a consideration of the following detailed description, taken in conjunction with the drawing which shows a schematic diagram of a power combining circuit in accordance with an illustrative embodiment of the invention.

DETAILED DESCRIPTION

Referring now to the drawing, there is shown a strip transmission line 11 having an input end 9 and an output end 10 and comprising an active conductor 12 displaced from a ground conductor 13. The purpose of the transmission line is to combine the outputs of a primary oscillator 14 and a plurality of secondary oscillators **15*a* through 15*e*. The first port of a circulator 16 is connected to the primary oscillator 14. The second port is connected to the strip transmission line via a coaxial cable 17, and the third port is connected to a power meter 23. The inner conductor of the coaxial cable 17 is directly connected at the input end 9 to the active conductor 12 of the strip transmission line and the outer or ground conductor of the coaxial cable is connected to the ground conductor 13 of the strip line. Secondary oscillators 15*a* through 15*e* are reactively coupled to the strip transmission line by coaxial cables 18*a* through 18*e*, each of which includes tuning stubs 19*a* through 19*e*. In the embodiment shown, capacitor plates 24*a* through 24*e* capacitively couple the secondary oscillators to the active conductor 12. A power meter 20 is connected to an output end 10 of the strip line 11 by way of a coaxial cable 21 having a tuning stub 22**.

All of the oscillators 14 and **15*a* through 15*e* are designed to oscillate at approximately the same frequency. However, if the primary oscillator 14 were not isolated from the transmission line, the power delivered by the oscillators would establish numerous oscillatory modes in the strip transmission line and would not be delivered to the output as a continuous coherent wave. It can be shown, however, that, when the primary oscillator 14 is isolated from the transmission line 11, all of the secondary oscillators 15*a* through 15*e* will be frequency locked to the primary oscillator and energy will be transmitted in only one oscillatory mode through the transmission line. The circulator 16 isolates primary oscillator 14** from the transmission line because it permits energy to flow from the oscillator to the transmission line but does not permit energy to flow from the transmission line to the oscillator.

The fact that the power outputs of the various oscillators combine to give a single transmission mode in the transmission line can be proven theoretically; however, because the proof is very extensive and highly mathematical, it has been omitted.

While the conditions described above will give power combining, they will not necessarily give directional coupling and power may propagate toward both the output end 10 of the strip line and the input end 9. It can be shown, however, that if the separation distances *d* between successive reactive connections to the transmission line are each an odd number of quarter wavelengths at the operating frequency, and if there is proper reactive coupling to the line, then all of the oscillator power will propagate toward the output end of the transmission line. But since the power combining circuit is intended to operate at microwave frequencies, usually in excess of 1000 megacycles per second (1 gigahertz), it is very difficult to mechanically separate the reactive couplings to precisely an odd number of quarter wavelengths. It can further be shown, however, that compensation for deviations from the optimum spacing can be made by tuning the resonant circuits of each of the secondary oscillators.

Each of the oscillators 15*a* through 15*e* has a resonant tank circuit which determines the frequency band of its output oscillations. When the oscillators are connected as shown, each tuning stub 19*a* through 19*e* effectively constitutes part of the resonant circuit of its respective oscillator, and fine tuning of each oscillator can be made by adjusting the tuning stub. While the tuning of each oscillator, required for compensating for a given deviation from the optimum spacing, can be stated mathematically, the equations are very complex and of little assistance in making and using the circuit.

Assuming that all of the secondary oscillators deliver approximately the same power output at the operating frequency, another criterion for directional coupling is that the capacitive coupling of the secondary oscillators to the transmission line should be progressively weaker from the input end toward the output end; that is, the coupling provided by plate 24*a* should be stronger than that of plate 24*b*, which in turn is stronger than that of plate 24*c*, and so forth. Again, a mathematical determination of the coupling parameters can be made, but the actual couplings are best made empirically, bearing in mind that successive plates 24*a–e* should be progressively spaced further from the active conductor from the input end to the output end to give progressively weaker coupling.

As a practical matter, each tuning stub and its associated capacitor plate should be adjusted individually to maximize the power delivered to the output end 10 of the transmission line and to minimize the power delivered to the input end. This may be done by monitoring power meters 20 and 23 while successively adjusting each of the tuning stubs and its corresponding capacitor plate such that the power recorded by meter 20 is at a maximum and that recorded by power meter 23 is at a minimum.

If the frequency tuning band of each of the secondary oscillators 15*a* through 15*e* is sufficiently wide, tuning compensation can be made for any deviations from the optimum spacing *d* to eliminate completely all power delivered to power meter 23. When this is done, all of the power of the various oscillators are not only combined to propagate in a single mode through the strip line, but all of the outputs are directionally coupled to propagate energy only toward the output end of the line. With all of the oscillators delivering power in the microwave frequency range, and with the primary oscillator delivering a reasonably high power output by comparison with the power outputs of the secondary oscillator, the secondary oscillators will be locked in frequency to the primary oscillator notwithstanding the individual tuning of the oscillator resonant circuits. Even if the power output of primary oscillator 14 is only a fraction of the power output of the secondary oscillators, resonant circuit tuning can be made over a range of several percent, while still obtaining frequency locking; and if the power output of the primary oscillator is equal to or higher than that of the secondary oscillators, this tuning range is substatnially increased.

After the tuning has been made, the output end of the strip line may be connected to an appropriate load 26 by way of a switch 27. If so desired, the power meter 20 may be dispensed with entirely, the transmission line may be connected directly to the load 26, and the tuning may be done by monitoring only the power meter 23 for minimizing power flow toward the input end of the transmission line.

A power combining circuit of the type shown in the drawing has been made using oscillators locked at a frequency of approximately 1.3 gigahertz. The transmission line 11 was a strip line having a characteristic impedance of approximately 50 ohms with capacitive couplings 24*a* through 24*e* each separated by a distance *d* of 1¾ inches. The capacitors consisted of 1 inch threaded metal disks which could be screwed down from the top to be in proximity to the active conductor as shown. The tuners 19*a* through 19*e* were double stub tuners each consisting of a pair of cylinders extending transversely from the outer conductor of the coaxial cable with each cylinder containing a slideable tuning plunger. The secondary oscillators 15*a* through 15*e* were General Radio type 1218 oscillators each comprising a single triode tube with the output coupled to the plate tuning cavity. The power supplies were selected to give reasonably constant outputs from the oscillators. The primary oscillator 14 was a Fairchild MS300B transistor oscillator. Only three secondary oscillators were used and the combined output of the primary oscillator and the three secondary oscillators was +7.9 dbm, which was only about .5 db lower than the algebraic sum of the four oscillator outputs less transmission losses.

In any practical utilization of this circuit, it is anticipated that solid state microwave oscillators such as those using Gunn-effect diodes, LSA diodes, IMPATT diodes, or transistors, would be preferred as the primary and secondary oscillators, since the major drawback of such solid state sources is their relatively low individual power output capacity. The use of a strip transmission line with coaxial cables and capacitor plates being used to couple the secondary oscillators to the transmission line seems to be quite practical, although a number of other embodiments could alternatively be used. The transmission line 11 may be any wave transmission line and the secondary oscillators may be inductively rather than capacitively coupled to the line. Single stub tuners, variable line stretchers, and various other devices may be convenient for fine tuning of the various secondary oscillators, depending primarily on the frequency of operation and the particular form of transmission line used. Likewise, the circulator 16 is intended to represent only one convenient device for isolating the primary oscillator 14 from the transmission line.

Various other embodiments and modifications may be devised by those skilled in the art without departing from the spirit and scope of the invention.

What is claimed is:

1. A microwave frequency generator comprising:

a primary oscillator having a characteristic frequency and connected near an input end of a transmission line;

an output coupler connected near an output end of the transmission line;

a plurality of secondary oscillators each having a resonant circuit associated therewith that is tuned to approximately the primary oscillator characteristic frequency;

each secondary oscillator being coupled to the transmission line between the input end and the output end by a coupler which permits energy to flow from the oscillator to the transmission line and from the transmission line to the oscillator;

and means for substantially preventing energy from flowing from the transmission line to the primary oscillator while permitting energy to flow from the primary oscillator to the transmission line.

2. The microwave frequency generator of claim 1 wherein:

the couplings of successive secondary oscillators to the transmission line are spaced apart by a distance each approximately equal to an odd integral number of quarter wavelengths at the frequency of operation, and further comprising means for providing progressively weaker coupling of the secondary oscillators to the transmission line in a direction taken from the input end to the output end of the transmission line, whereby secondary oscillator energy is caused to propagate predominantly toward the output end of the transmission line.

3. The microwave frequency generator of claim 2 further comprising:

means for further directing the output energy of the secondary oscillators toward the output end comprising means for tuning the resonators associated with the secondary oscillators, thereby compensating for deviations from the odd quarter wavelength spacings.

4. The microwave frequency generator of claim 3 wherein:

the means for directing output energy further comprises a power meter coupled to the transmission line, whereby an operator may tune each resonator and adjust each secondary oscillator coupling means such as to maximize power directed to the output end of the transmission line.

5. The microwave frequency generator of claim 3 wherein:

the means for preventing energy from flowing to the primary oscillator comprises a circulator;

and the means for directing output energy further comprises a power meter connected to the circulator, whereby an operator may tune each resonant circuit and adjust each secondary oscillator coupling means such as to minimize power directed to the input end of the transmission line.

6. The microwave frequency generator of claim 3 wherein:

said transmission line comprises an active conductor and a ground conductor for propagating microwave frequency energy therebetween; and further comprising:

means for capacitively coupling each of the secondary oscillators to the active conductor of the transmission line.

References Cited

UNITED STATES PATENTS

| | | | |
|---|---|---|---|
| 3,127,572 | 3/1964 | McLeod | 331—55 |
| 3,160,826 | 12/1964 | Marcatili | 331—107 X |
| 3,254,309 | 5/1966 | Miller | 331—107 X |

ROY LAKE, Primary Examiner

S. H. GRIMM, Assistant Examiner

U.S. Cl. X.R.

331—99, 107, 172; 333—27, 35